July 15, 1941.  J. M. SHIMER  2,249,400
PUMP PISTON
Filed Dec. 15, 1939
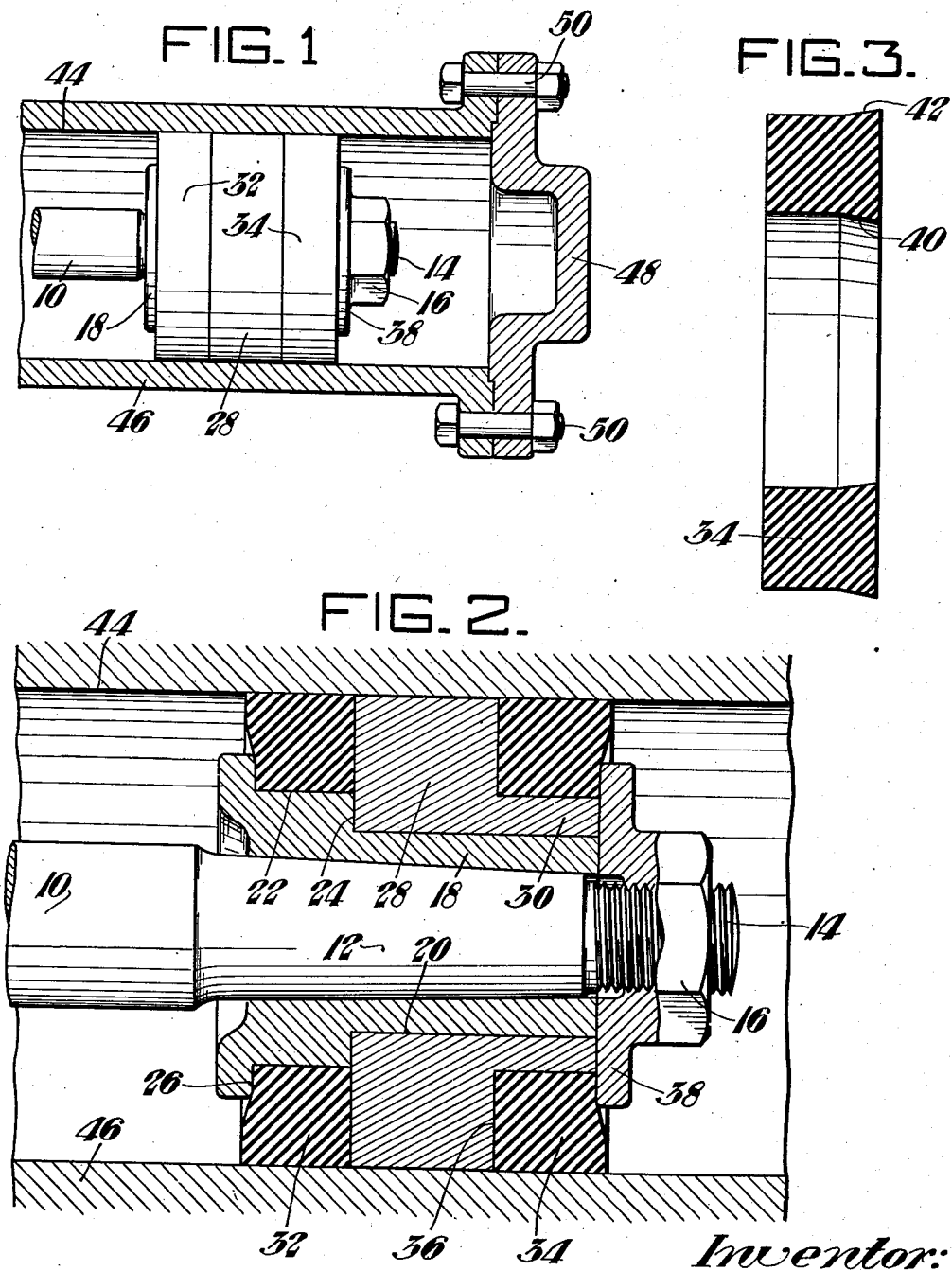
Inventor:
JOHN M. SHIMER,
by John E. Jackson
His Attorney.

Patented July 15, 1941

2,249,400

UNITED STATES PATENT OFFICE 2,249,400

PUMP PISTON

John M. Shimer, Dallas, Tex., assignor to Oil Well Supply Company, a corporation of New Jersey Application December 15, 1939, Serial No. 309,505

11 Claims. (Cl. 309—4)

This invention relates to pistons used in reciprocating pumps which, while not limited thereto, are peculiarly well suited for use in slush pumps handling abrasive fluids at high pressures, such as encountered in drilling deep oil wells.

Due to the nature of conditions under which such pumps operate, it is desirable to provide a construction wherein frequent replacements of worn parts may be quickly and easily made in order to maintain a high operating efficiency for the pump. Accordingly, it is among the objects of this invention to provide a construction which will permit the ready replacement of worn piston parts without discarding the entire piston so as to thereby effect a saving in the maintenance cost of pump operation.

Another object is to provide a piston that need not necessarily be completely removed from the pump cylinder or liner in order to repair, adjust, or replace its component parts.

A further object is to provide a rugged, light-weight piston that does not tend to creep on the piston rod and which is composed of a minimum number of readily replaceable parts.

An additional object is to provide a piston structure whose componet parts can be made in sizes well suited for functioning with cylinders or pump liners of various diameters.

Another object is to provide a novel insert ring of pliable material which seals itself both against the inner wall of the cylinder and against the body of the piston.

The above and further objects of the invention are attainable by the utilization of a piston constructed and arranged as hereinafter more fully described and claimed. For a complete disclosure of the invention, reference should be made to the accompanying drawing, in which:

Figure 1 is a longitudinal section through a portion of a pump cylinder within which operates a piston embodying the present invention;

Figure 2 is an enlarged view in longitudinal section illustrating in detail the claimed features of the improved piston;

Figure 3 is a detail longitudinal section of a pliable resilient ring comprising one of the novel component parts of the improved piston.

Referring in detail to the drawing, reference numeral 10 represents a piston rod having a tapered shank 12 on which the improved piston is mounted. The outer extremity of the shank of the piston rod is slightly reduced in diameter and provided with screw threads 14 for reception of a nut 16 which serves to detachably hold the parts in proper assembled relation.

A metallic sleeve 18 is firmly secured on the shank 12 when the nut 16 is screwed home. While the sleeve 18 will usually be mounted on a tapered shank as shown, it is obvious that if desired, the shank could be of cylindrical form and the nut could press the sleeve against a shoulder formed on the piston rod.

The sleeve is of stepped form in longitudinal section, thus providing bearing portions 20 and 22 and substantially radial shoulders 24 and 26. The sleeve 18, with its two bearing portions 20 and 22 and its two substantially radial shoulders 24 and 26, may be referred to as a sleeve having a two-step outturned retaining flange. Seated on the bearing portion 20 and abutting the shoulder 24 is a core or body 28, the extremity of which is of reduced diameter, thus forming the annular section 30. This core or body is made of light-weight material of suitable strength. It is highly satisfactory when composed of non-metallic material such as the phenolic condensation product known by the trade name of Bakelite.

A ring 32 of pliable resilient material, such as rubber or its equivalent, is mounted on the bearing portion 22 of the sleeve and is held firmly and compressively against the shoulder 26 through the cooperation of the core member 28 and the nut 16.

A similar pliable resilient ring 34 is mounted on the section 30 of the core member. This latter ring is pressed against the face 36 of the core member 28 by the annular flange 38 which in the embodiment shown is formed integral with the nut 16. Alternatively the nut could be arranged to press against a washer of a size comparable to the flange 38.

The pliable rings 32 and 34 are of substantially duplicate construction, and prior to assembly they are of the cross-sectional form illustrated in Figure 3. This figure illustrates the ring 34. The ring 32 will be identical therewith, but assembled in reverse position. Each ring prior to assembly has an inwardly-projecting lip 40 and a similar outturned lip 42, these lips being conveniently formed by making the respective rings in a mold. The inturned lips 40 serve as self-sealing means when the component parts of the piston are properly assembled and the nut 16 is screwed home. Thus the tightening of the nut on the rod provides pressure-packed surfaces past which fluid cannot leak. The left end of the core 28 is held firmly against the shoulder 24 so that fluid cannot pass at this zone. The core also compressively holds the resilient ring 32 in contact with the shoulder 26. In short, the nut effectively cooperates with the shank of the rod, the sleeve, core, and flexible rings, to hold the rings in a compressed state. Because of the provision of outwardly-extending lips 42 on the resilient rings, they are also held in compressive relation to the wall 44 of the pump cylinder 46.

The novel construction and arrangement of the piston described is such that, when occasion arises, various component parts thereof can be removed for replacement or repair without dismantling the entire pump. To effect such replacement it is necessary only to remove the cylinder head 48 by detaching the holding nuts 50, whereupon access may be had to the nut 16 which can be unscrewed by the use of a suitable socket wrench. With the nut 16 removed, the rings 32 and 34 and core 28 can be removed individually. Because of the inherent features of construction and arrangement of the parts, it will be apparent that variation in piston diameter can be readily secured by using different sized parts to suit cylinders or pump liners of different diameters merely by changing the sizes of the light-weight core and flexible rings.

Although I have described with particularity the specific embodiment of the invention herein illustrated, it is to be understood that various modifications may be made by those skilled in the art without departure from the invention as defined in the appended claims.

I claim:

1. A piston rod carrying a piston comprising a sleeve shaped in longitudinal section to provide two shoulders and two bearing portions, a core mounted on one of said bearing portions and engaging one of said shoulders, a resilient ring mounted on said other bearing portion and engaging said other shoulder, said core having an annular section, a second resilient ring mounted thereon, and means secured to said piston rod effective to compressively hold said resilient rings in assembled relation with respect to said sleeve and said core.

2. A piston rod carrying a piston comprising a metal sleeve shaped in longitudinal section to provide two substantially radial shoulders and two bearing portions, a light-weight core of non-metallic material mounted on one of said bearing portions and engaging one of said shoulders, a ring of resilient material mounted on said other bearing portion and engaging said other shoulder, said core having an annular section, a second ring of resilient material mounted thereon, and means removably secured to said rod effective to compressively hold said resilient rings in assembled relation with respect to said sleeve and said core.

3. A piston rod carrying a piston comprising a sleeve having two bearing portions and two shoulders, a core mounted on said rod, respective resilient rings, one mounted on said sleeve and the other on said core, and a nut adjustably attached to the rod for securing the aforesaid parts in assembled relation on the rod.

4. A piston for use on a reciprocating piston rod comprising a sleeve having a two-step retaining flange, and a flanged center portion separating a pair of resilient rings, one of said rings being mounted on said sleeve and the other on said flanged center portion, the entire assembly being retained against lateral movement with respect to the rod by a member adjustably attached to the rod.

5. A piston for mounting on a reciprocating piston rod comprising a sleeve having an outturned retaining flange, a rubber insert contacting the inside face of said sleeve flange and a core for supporting the other side of said rubber insert slidable over said sleeve and contacting with the inner face of the above flange, a second rubber insert slidable over said core into position, and a nut secured to the end of the piston rod adapted to compressively hold said rubber inserts in place.

6. A light-weight piston for heavy duty slush pump operation comprising a metallic sleeve of relatively small thickness formed at one end with an outwardly-extending annular flange, a rubber ring contacting the flanged end of said sleeve, a non-metallic core of light-weight material mounted on said sleeve in engagement with said ring, and a second rubber ring mounted on said core, said rings and said core section being removable from the sleeve in an endwise direction.

7. A light-weight piston with replaceable parts comprising a sleeve on which said parts are positioned, a replaceable rubber ring mounted on said sleeve and positioned on one side by an outwardly-extending flange on said sleeve, a light-weight core slidable over said sleeve into contact with the opposite side of said rubber ring, and another replaceable rubber ring detachably mounted on said core.

8. A light-weight piston for heavy duty slush pump work, comprising a multiple stepped sleeve, a resilient ring member mounted in side engagement with the outermost step of said sleeve, a light-weight core mounted on said lowermost step in engagement with said first resilient member, a second resilient ring member in engagement with said light-weight core member and means to compressively hold said resilient ring members in assembled relationship with respect to said sleeve and said core.

9. A piston for heavy duty mounted on a reciprocating piston rod comprising a sleeve having a two-step retaining flange, a resilient insert contacting the inside face of the outer step of said flange and a removable core for supporting the other side of said resilient insert, slidable over said sleeve into engagement with the lower lip of said flange and a second replaceable resilient insert slidably mounted over said core, each of said resilient inserts having an inturned self-sealing lip to prevent the flow of fluid thereby.

10. In a reciprocating pump piston having a pair of replaceable resilient inserts, a core of light-weight material adapted for cooperative engagement between each of the resilient inserts, said core and resilient members forming the engaging surface of said pump piston, said core consisting of a ring of light-weight material having an elongated longitudinal portion extending in one direction only, said light-weight ring of the core member engaging each of the resilient ring members for placing one of said ring members in a limited state of compression when the core is assembled in position.

11. A piston for heavy duty pumping, comprising readily removable and replaceable parts, consisting of a sleeve with an outwardly engaging flange thereon, a resilient ring slidable over said sleeve into engagement with said flange, a core with an outwardly engaging portion slidable over said sleeve into engagement with the other side of said ring, said core having an extending longitudinal portion, a second resilient ring for cooperative engagement with the other side of the outwardly extending portion of said core and holding means for positioning the end portion of the longitudinal core extension, compressing said resilient ring members.

JOHN M. SHIMER.